Sept. 11, 1956

C. D. VROOMAN ET AL 2,762,897

DE-ICING MEANS FOR AIRCRAFT AND THE LIKE

Filed June 28, 1951

INVENTORS
CARLL D. VROOMAN
BY BERNARD L. MESSINGER

George Sullivan
Agent

Sept. 11, 1956 C. D. VROOMAN ET AL 2,762,897
DE-ICING MEANS FOR AIRCRAFT AND THE LIKE
Filed June 28, 1951 7 Sheets-Sheet 2

INVENTORS
CARLL D. VROOMAN
BY BERNARD L. MESSINGER

George C. Sullivan
Agent

Sept. 11, 1956  C. D. VROOMAN ET AL  2,762,897
DE-ICING MEANS FOR AIRCRAFT AND THE LIKE
Filed June 28, 1951  7 Sheets-Sheet 5

Fig. 9

INVENTORS
CARLL D. VROOMAN
BY BERNARD L. MESSINGER

George A. Sullivan
Agent

Sept. 11, 1956  C. D. VROOMAN ET AL  2,762,897
DE-ICING MEANS FOR AIRCRAFT AND THE LIKE
Filed June 28, 1951  7 Sheets-Sheet 7

Fig. 11

INVENTORS
CARLL D. VROOMAN
BY BERNARD L. MESSINGER
Agent

United States Patent Office 2,762,897
Patented Sept. 11, 1956

2,762,897

DE-ICING MEANS FOR AIRCRAFT AND THE LIKE

Carll D. Vrooman, La Crescenta, and Bernard L. Messinger, Pacific Palisades, Calif., assignors to Lockheed Aircraft Corporation, Burbank, Calif.

Application June 28, 1951, Serial No. 234,054

5 Claims. (Cl. 219—20)

This invention relates to aircraft and other instrumentalities having surfaces subject to the accumulation of unwanted ice under certain conditions of operation, and relates more particularly to a means or system for de-icing such surfaces, that is for preventing the accumulation of excessive quantities of ice.

Aircraft have been equipped with devices or means of various kinds for preventing the excessive accumulation of ice on their wings, stabilizers, rudders, etc. Resort has been had to de-icing boots of rubber, or the like, arranged on the leading edge portions of the wings, etc. and capable of inflation by internal pneumatic pressure to break free the accumulated ice. Such inflatable boots are sensitive to the particular operating conditions in many instances, and are rather difficult to maintain in proper operating condition. The so-called anti-icing systems that have been employed include the hot air type and the electro-type. In the case of the hot air type of anti-icing system, heated air is circulated through the interior of the wing or other part to maintain the external surfaces at a sufficiently high temperature to prevent the formation of ice thereon. The successful operation of such a system requires the maintenance of a sufficiently high temperature on the external surfaces to insure the complete evaporation of all impinging water during potential icing conditions. In many present day aircraft this involves a very large energy requirement, for example in the neighborhood of several thousand B. t. u. per hour per square foot. The provision of heat energy in these quantities necessitates an excessively heavy installation and maintenance during operation is difficult. With the electro anti-icing systems there is, of course, the same heat energy requirement which means that the airplane must be equipped with excessively large and heavy generators or alternators, absorbing a substantial portion of the powerplant output to supply the necessary electrical energy. Furthermore, the electro systems often involve heating elements in the form of separate wires or woven wires embedded in the rubber of the boots, the rubber being a poor distributor of heat requiring the use of a large amount of heat, thereby necessitating the application of additional electrical energy. There have also been proposed and introduced electro-pneumatic boots, etc. involving combinations of electric heating and the mechanical ice breaking but such devices have the same shortcomings as the other systems already mentioned.

It is an object of the present invention to provide a cyclic de-icing means that is light in weight and that requires a minimum of energy for its effective and efficient operation. In accordance with the present invention there is the cyclic accumulation and removal of tolerable amounts of ice from the surfaces to be protected with the minimum use of electrical energy.

Another object of the invention is to provide a de-icing system of this class incorporating heating elements arranged as near as possible to the accumulated ice and shaped and mounted to effect the most efficient transfer of heat to the surface to be de-iced. The elements, which are the heat sources, are separated from the ice by a minimum distance and with a minimum of dielectric material therebetween and are in the nature of thin, relatively broad ribbons so that a maximum amount of the heat is directed outwardly from essentially one-half of the total aggregate area of the element system, assuring the outward direction or transfer of the maximum amount of heat. The thin ribbon-like elements, arranged with their broad faces in close relation to the metal-ice interface with a minimum of material therebetween, avoid the excessive heat losses of prior electro-de-icing systems and provide for or permit the cyclic or successive application for short periods of high power density to release or break the bond between the ice and the boot surface.

Another object of the invention is to provide a de-icing system of this character wherein there is the highly efficient transfer of heat from the elements to the ice accumulation. The boot or de-icing unit of the invention includes a thin metal outer skin and the broad ribbon-like electrodes are separated therefrom by a minimum thickness of a dielectric material so that the heat is efficiently transferred outwardly to the metal skin where it is distributed therethrough to break the bond of the ice with the metal skin. There is little material acting as a heat barrier, absorber or ballast and the outer skin, being metal and a good conductor of heat, effectively distributes the heat through the area to be de-iced.

Another object of the invention is to provide a de-icing system of this kind that operates on the novel principle of melting little ice, thereby resulting in a minimum of water run-back onto the unheated region of the wing or other surface, which water run-back would tend to build up a heavy ice accumulation at such region. In contrast with prior thermal de-icing and anti-icing devices where there is a considerable melting of the ice and, therefore, a substantial volume of water released which runs back to re-freeze on the wing or other part, the present system momentarily applies relatively high intensity heat to break the bond at the metal-ice interface and to cause sufficient thermal expansion of the inner stratum of the ice to tend to cause the ice to crack so that it is carried or blown free by the slipstream or relative airflow across the surface.

Another object of the invention is to provide a de-icing system of this character employing a novel and very effective cyclic sequence wherein full advantage is taken of the ice breaking or cracking action of the short duration, high intensity heating and the blowing away of the ice thus freed, as mentioned in the preceding paragraph. In accordance with the invention, there is a plurality of elongate or strip-like groups of heating elements extending span-wise of the wing, or other part, and spaced chord-wise one from the other and these elements of any one series or group are successively energized for very short periods, beginning with the element nearest the leading edge, the energization of the elements progressing in the aft direction so that the ice is first cracked free near the leading edge then in an adjacent and slightly aft region, then in an adjacent and still further aft region, and so on, so that the ice accumulation is progressively "peeled back" and carried away by the relative airflow from adjacent the leading edge rearwardly toward the trailing edge of the boot. This chord-wise cyclic energization of the heating elements has proven to be the most effective in cleanly removing the ice accumulation with a minimum of applied heat and with little or no apparent run-back of the water. Where the relative air stream is employed to carry away the freed ice and where the high intensity heat is supplied in this chord-wise sequence, full advantage is taken of the thermal cracking action (with little or no apparent actual melting of the ice) and of the relative wind so that there is much less heat supplied to and wasted in the ice layer than in earlier de-icing and anti-icing systems. This, in turn, means that the electrical supply system of the airplane is not overtaxed when the de-icing system is in operation.

A further object of the invention is to provide a de-icing unit or boot characterized by novel heating elements. The boot incorporates the ribbon-like heating elements that are very thin and ductile so as to remain bonded to the outer sheath during fabrication forming processes and during violent temperature changes, the thin ductile ribbons resisting buckling and shearing of their bonds at such times. These ribbons may be tapered both in thickness and in width to permit the use of uniform electrical power density over a tapered wing surface, or the like, and are preferably formed of copper or other metal of high conductivity, permitting the energization of long narrow spanwise strips or elements without the need for intermediate input or feed-in buses. Thus it will be seen that the thin heating elements, which may either be electro-deposited or applied in the form of bonded metal foil strips, possess numerous advantages.

A further object of the invention is to provide a boot of this kind of novel and improved construction. The boot is substantially rigid so that it may be secured to the structure by screws, or the like, without the use of adhesives, putties, or like materials, thus greatly facilitating the installation, removal and servicing. The rigid construction also facilitates the electrical installation, permitting the employment of permanently installed wiring in the wing or other structure and the use of mating contact buttons on the boot and structure, thus providing for rapid installation and removal of the boot. The rigid boot also includes a metal outer skin in close relation to the heating elements, assuring effective heat conduction and distribution to the metal-ice interface. The metal skin may be grounded to the airplane structure to avoid the accumulation of precipitation static electricity. These several novel features and advantages which flow from the use of a metal outer skin, are not found in the earlier boots presenting an outer surface of rubber, or the like. The outer skin of the boot of this invention may be constructed of anodized aluminum to be more resistant to water abrasion than the previous rubber boots.

These and other features and objectives will become apparent from the following detailed description of typical preferred forms and applications of the invention wherein reference is made to the accompanying drawings, in which

Figure 3 is an enlarged extended or stretched out plan view of one of the boots with the outer metal sheath or skin and the dielectric layer broken away to illustrate the heating elements of the boot in plan elevation;

Figures 1, 2:
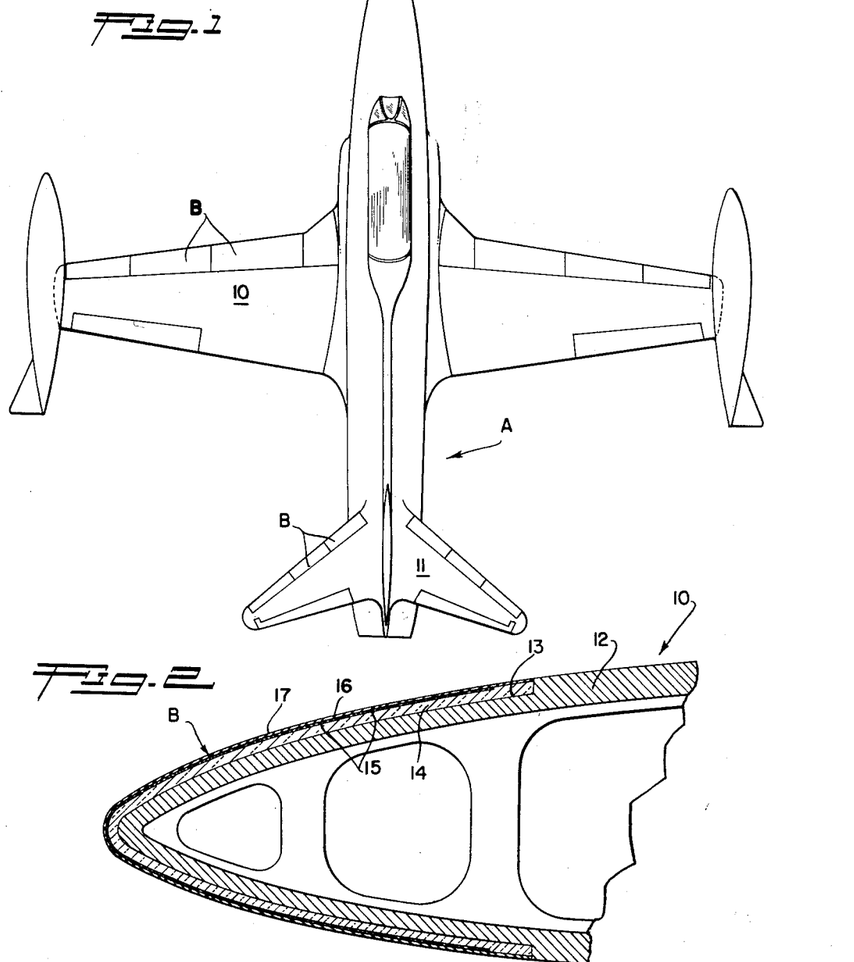
Figure 1 is a plan view of an airplane showing de-icing boots of the invention arranged on the leading edge portions of its wings and tail surfaces.
Figure 2 is an enlarged vertical sectional view of one of these leading edges illustrating the boot thereon.
Figure 2:
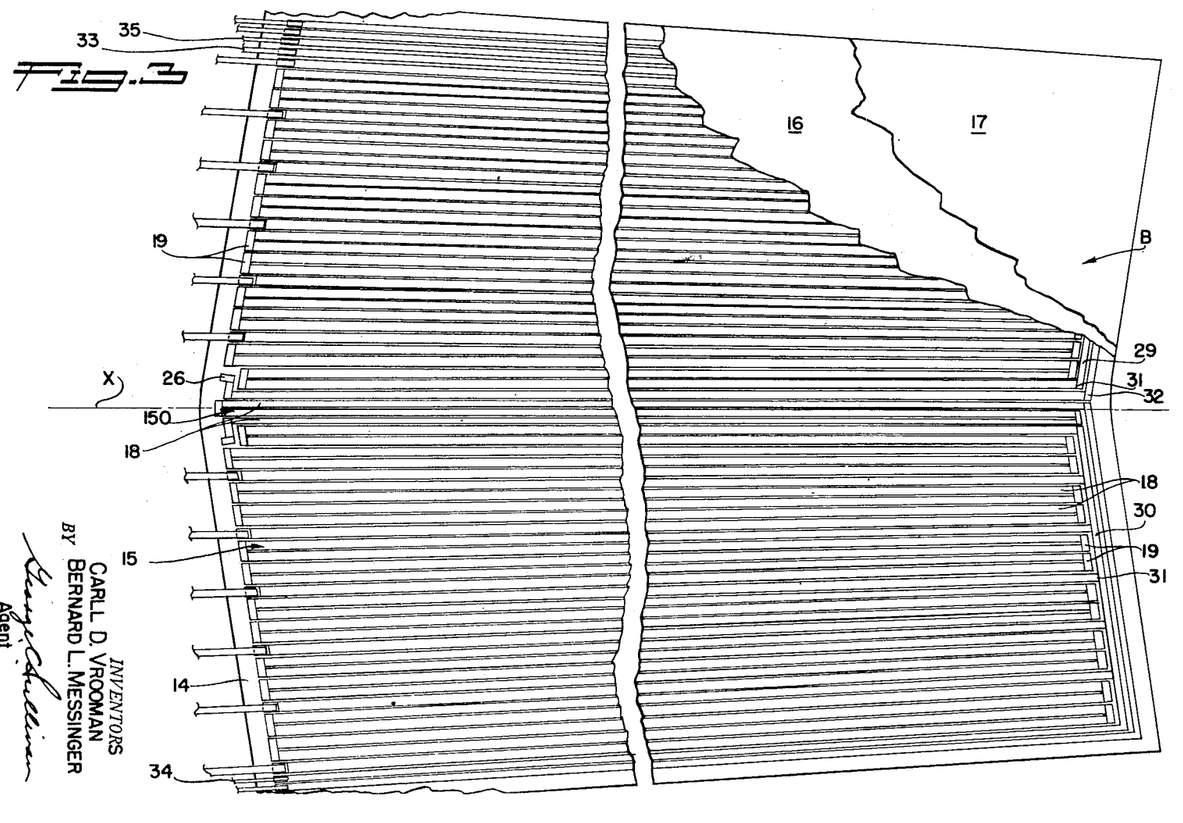

The de-icing means of the invention may, of course, be employed on aircraft of various types and may well be adapted for other applications where it is desired to remove accumulations of ice. The boots and other parts may be modified or altered to suit them for given applications. Accordingly, the particular forms and applications of the invention herein described are not to be construed as limiting the invention but are to be taken as exemplary of preferred constructions. In Figure 1, we have shown boots B of the invention provided on the leading edge regions of the wings 10 and tail surfaces 11 of an airplane A, it being apparent that similar boots may be arranged on other parts as required. The several boots B may be substantially the same except for size and other features which will later be described and the following detailed description of one of the boots B may be considered as applicable to the others. As shown in Figure 2, the boot B is recessed in the wing 10, or other part, to have its outer surface substantially flush with the surface of the wing, it being understood that the boot may be applied over the surface of the wing or other part. The recessing, of course, may be accomplished in various manners. In the particular case illustrated, the skin 12 of the wing 10 is quite thick and its forward portion has a recess 13 formed therein to receive the boot B. This recess 13 extends rearwardly a required or selected distance in both the upper and lower sides of the skin. The chordwise extent of the recess 13 and the boot B depend upon the character of the wing 10 and other factors. As will be seen in Figure 2, the boot B is shaped and proportioned to follow the contour of the wing 10, that is it occupies the recess 13 in such a manner that its outer surface is flush with the surface of the skin 12.

The boot B includes an inner layer or sheet 14 of thermal insulating and backing material, a plurality of thin, ribbon-like heating elements 15, a dielectric layer 16 over the elements 15 and an outer sheath or skin 17, preferably of aluminum or other metal. These parts are best illustrated in Figures 2 to 7 inclusive where the thickness of the heating elements 15 and the dielectric layer 16 are greatly exaggerated for the sake of clarity. The backing sheet 14 is constructed of any appropriate material that is substantially rigid, that is a good thermal insulator and that is an effective dielectric such as hard rubber, Bakelite, etc. In practice, the sheet 14 may be constructed of fibreglass cloth impregnated with a resin or plastic and molded or shaped to conform to the recess 13. This material is strong, rigid, and readily secured to the wing structure by screws, bolts, or the like, and forms an effective thermal barrier as well as an electric insulator.

The heating elements 15 are features of the invention incorporating several novel and advantageous concepts of construction and operation. As best illustrated in Figure 3, each boot B includes a plurality of heating elements 15, the elements being in the nature of elongate strips or ribbons arranged spanwise. The resistance type heating elements 15 may preferably extend in parallel relation and are spaced one from the other. Each element 15 may comprise a single, simple strip electrically connected at each end with the timed current supply system, to be later described. However, it will usually be preferred to construct each heating element 15 to include two or more passes or runs, that is two or more longitudinally or spanwise extending strips appropriately electrically joined at their ends and electrically connected in the current supply system. Thus, referring to Figure 3, it will be seen that each heating element 15, with the exception of element 150 at the center of the boot, that is at the extreme leading edge, includes five longitudinal or spanwise extending strips or passes 18. While we have shown the adjacent heating elements 15 equally spaced in the chordwise direction and have shown the several runs 18 of the elements of substantially the same or equal spacing, it will be apparent that the relative spacing may in some situations be varied or graduated. The adjacent ends of the contiguous arms or runs 18 of the elements 15 are electrically connected in such a manner that the several runs of each element 15 constitute a single electrically continuous resistance type heating element. Thus in Figure 3 there are transverse or chordwise parts 19 connecting these ends of the adjacent runs 18. These parts 19 may be integral with their respective connected runs 18 or may be separately formed and suitably joined with the runs.

Figure 4:
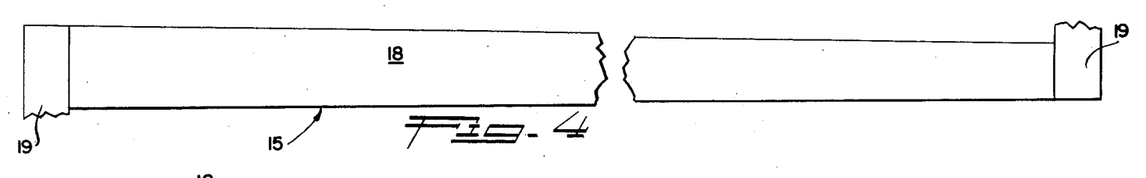
Figure 4 is a greatly enlarged plan view of a part or run of one of the heating elements of the boot.
Figure 5:
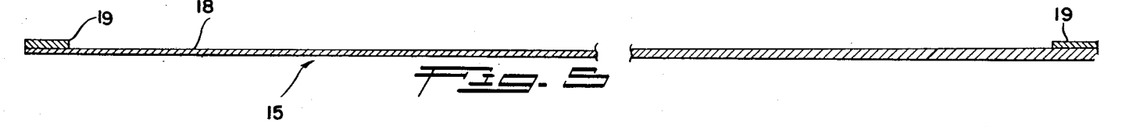
Figure 5 is a vertical or longitudinal sectional view of the heating element part, the thickness being exaggerated to better illustrate the tapering of the element.
Figure 11:
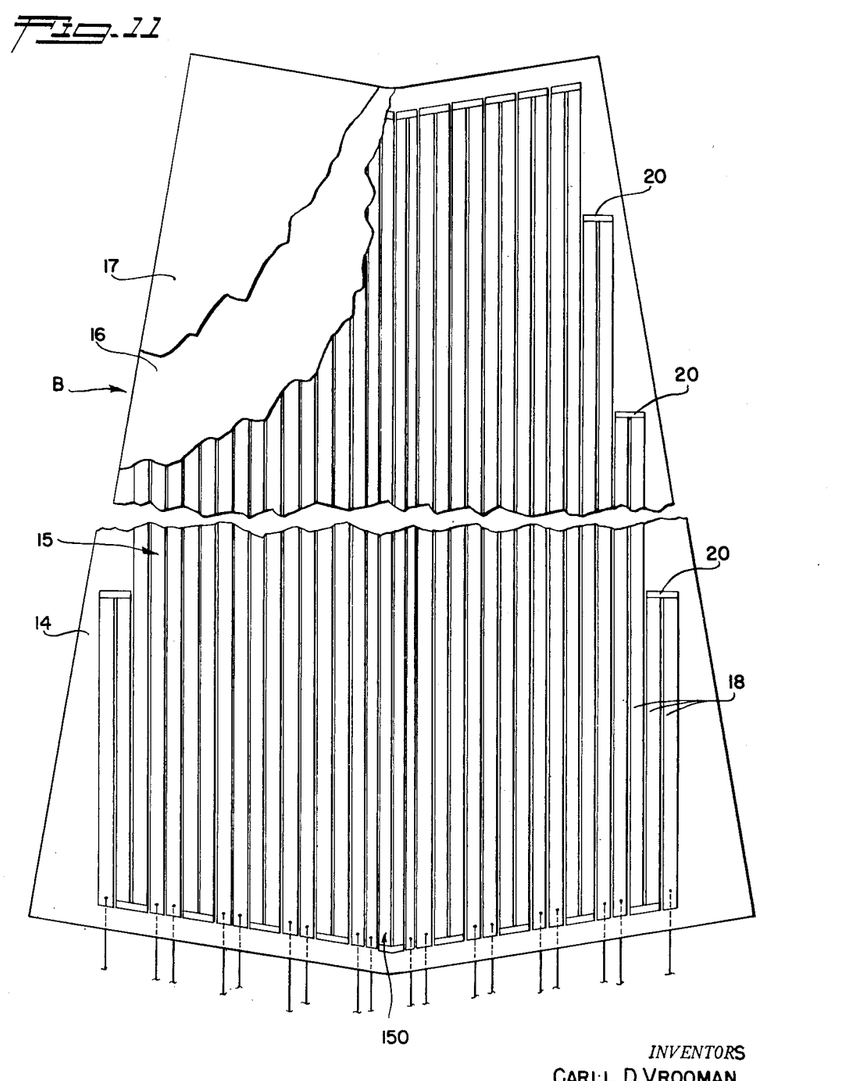
Figure 11 is a view similar to Figure 3 illustrating another type of heating element arrangement of the invention.

The invention contemplates the manufacture or fabrication of the heating elements 15 in any selected or suitable manner. In accordance with one preferred method the elements 15 are formed of thin metal sheets or foil of, say, from .0004 to .0015 inch thickness, secured to the dielectric film or layer 16 by adhesive or by other bonding means. When thus formed of foil or thin metal sheet, the material for the entire series of heating elements 15 of a boot B may be a single uninterrupted sheet or, say, two such broad sheets applied to the dielectric layer 16 and metallic ribbon strips, tape, or the like, may be secured to the under side of the foil sheets in such a manner and in such a pattern that the tape may be pulled off to tear free certain areas of the foil sheet or sheets and thus leave the spaces between the runs 18 and the spaces between the adjacent heating elements 15, defining the complete pattern of heating elements 15. In another and preferred method, the heating elements 15 are electro-deposited on the dielectric film or layer 16. In this latter method the elements 15 are each integral and continuous and are initially and finally deposited on the dielectric layer 16. This depositing or coating may be done by first applying an adhesive to the dielectric film, then precipitating silver on the adhesive in the desired pattern and then electrodepositing the copper or alloy of the heating elements on the silver. This manner of applying the conductive strips is advantageous as it permits the provision of heating elements 15 of any selected thickness and width and, if desired, of tapering thickness as well as tapering width. Thus, where the boot B is substantially or rather abruptly tapered by reason of being constructed for application to a part of diminishing width, the heating elements 15 and their several runs 18 may all extend the entire length of the boot and some or all of the runs 18 may be tapered or gradually diminished in width toward the narrow end of the boot and proportionately increased or tapered in thickness in the same direction so as to have the appropriate variation in electrical resistance to permit the use or application of uniform electrical power densities and therefore substantially uniform heating throughout the boot. Figures 4 and 5 illustrate a heating element run 18 that is tapered in width from one end to the other in this manner, Figure 5 illustrating on an enlarged and exaggerated scale the general increase in thickness of the run toward its narrower end. The electrical deposition of the elements 15 also has numerous other advantages, that is it assures the provision of heating elements 15 of uniform character, of good mechanical bonds with the dielectric layer 16, a selected thickness and quality of the metal making up the heating elements, etc. In Figure 11 there is illustrated a manner of stepping or progressively decreasing the length of the runs 18 of the heating elements 15 to adapt the elements to a tapered boot and airplane surface. Here the elements 15 that are near the aft margins of the boot B have their outboard ends 20 terminated at different distances from the inboard end of the boot. This provides for the substantially uniform or distributed heating while permitting the use of runs 18 of the same or uniform thickness as may be obtained by the applied metal foil. The heating elements 15 however formed and/or applied are preferably made of copper, aluminum, silver, or appropriate alloys, depending upon the thermal and electrical requirements of the system or installation.

The dielectric layer or sheet 16 is provided between the electrical heating elements 15, just described, and the outer sheath or skin 17. This film or layer 16 is constructed of a good dielectric material such as a vinyl compound or phenolic film, and may be applied to the internal surface of the skin 17 in a liquid state to subsequently set and cure as a solid layer, or may be a preformed sheet or skin secured to the metal skin 17 by cement or adhesive. It is a feature of the invention that this dielectric layer 16 is as thin as is consistent with electrical safety and mechanical handling during fabrication of the boot so as to offer a minimum resistance or deterrent to the outward transference of heat from the elements 15 to the outer sheath 17. In practice, where the layer 16 is formed of a vinyl compound, or the like, it may be from .001 to .020 inch thick. The thin dielectric layer 16 may cover the entire inner surface of the skin 17 or may cover just those major regions of the skin that are heated by the elements 15. The dielectric layer 16 is of such a character that the sudden and substantial changes in temperature accompanying the cyclic high intensity energization of the heating elements 15 do not cause cracking, buckling, shrinking, destruction or softening of the layer itself or interruption or breaking of the bonds between the layer and the heating elements 15 and the skin 17.

The sheath or skin 17 is the outermost or exposed member of the boot B, being exposed to the weather or elements and, therefore, the part on which the ice accumulates during flight of the airplane under icing conditions. While not necessarily constructed of metal, it is desirable to form this skin 17 of a material that is a good conductor of heat, that is resistant to the impact of rain drops, etc. and that is sufficiently rigid and strong to protect the thin heating elements 15. While copper is an excellent conductor of heat, it is also rather soft and, therefore, subject to denting by rain drop impact and we prefer to employ a metal that is stronger, lighter, and less ductile. We have found that a skin 17 formed of aluminum or an aluminum alloy is effective in conducting and distributing the heat from the elements 15 and is also reasonably resistant to rain drop denting, etc. The outer surface of the skin 17 is preferably anodized to be corrosion resistant and to better retain a water repellant material or coating such as a silicone compound. Such a coating will create a hydrophobic surface and cause the residual water droplets to quickly disperse and immediately blow away in the high velocity air stream so that the small quantity of water, if any, accompanying the de-icing operation has little or no tendency to run back and refreeze on the areas of the wing aft the boot B. In order to insure the maximum transmission of heat from the heating elements 15 to the ice accumulations with a minimum of heat loss, it is desirable to construct the skin 17 as thin as it is consistent with the required strength and resistance to rain drop denting. In practice, the skin, when constructed of aluminum or an aluminum alloy may be from .010 to .030 inch in thickness. The outer sheath or skin 17 preferably covers the entire outer face of the boot B. As previously described, and as best illustrated in Figure 2, the external surface of the skin 17 preferably lies flush with the external surface of the wing skin 12 and the boot B is so constructed and shaped that the skin or sheath 17 completes the desirable or intended leading edge configuration of the wing.

As mentioned above, the extreme forward or leading edge portion of the boot B is equipped with a heating element which we have designated 150. The provision of one or more such elements 150 in the boot B may not be essential in every application of the invention but we have found that it is usually desirable to continuously heat this region of the boot and the element or elements 150 are designated as the elements that are continuously energized during operation of the de-icing system. In practice, this element 150 may be of the same construction, configuration, etc., as the elements 15, described above, although it may have more or fewer runs 18. It is preferred to construct and arrange the runs 18 of the element 150 so that there are one or more runs at the extreme leading edge of the boot and one or more runs 18 immediately adjacent the leading edge. This is illustrated in Figure 3 where the line X represents the medial line of the boot B and, therefore, the extreme leading edge and where there are runs 18 immediately at this line X and at each side thereof. Where this element 150 is continuously energized there is a sufficient heating of the leading edge of the boot B to prevent the formation of ice thereon. Accordingly, it is not possible for a "cap" or bridge of ice to accumulate on the boot, which "cap" or bridge might be mechanically locked thereon even though its ice bond with the skin 17 is broken. Furthermore, this ice free region in the stagnation zone of the boot B leaves the leading edges of the ice accumulations on the upper and lower surfaces of the boot exposed, so that the high velocity of airflow over the boot is free to peel back and carry away the ice when the respective heating elements 15 are energized.

Figures 6, 7:
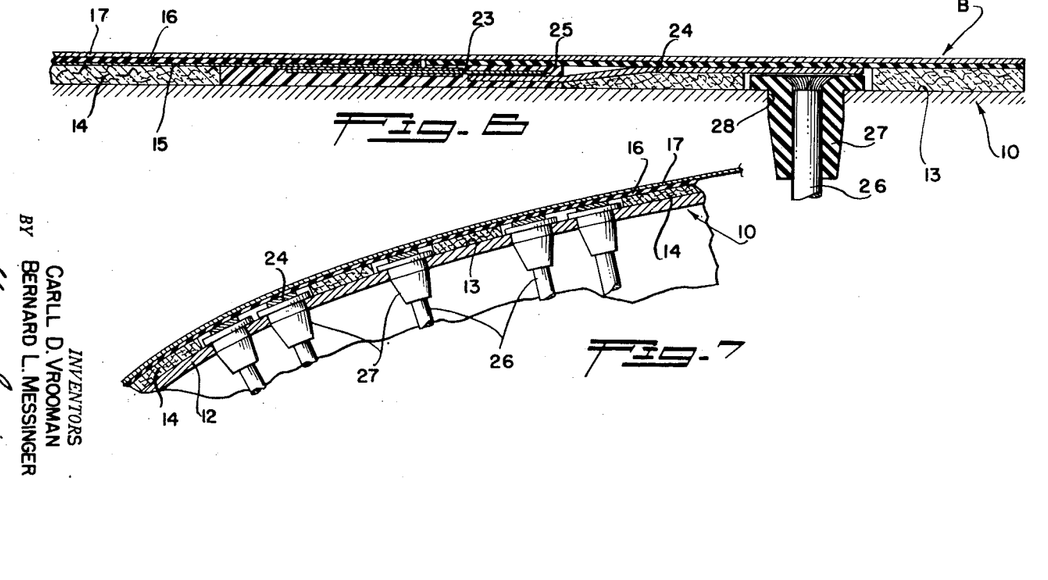
Figure 6 is an enlarged fragmentary sectional view of a boot taken substantially as indicated by line 6—6 on Figure 8, illustrating a lead-in electrical connection with one of the heating elements.
Figure 7 is an enlarged fragmentary sectional view taken substantially as indicated by line 7—7 on Figure 8.
Figure 8:
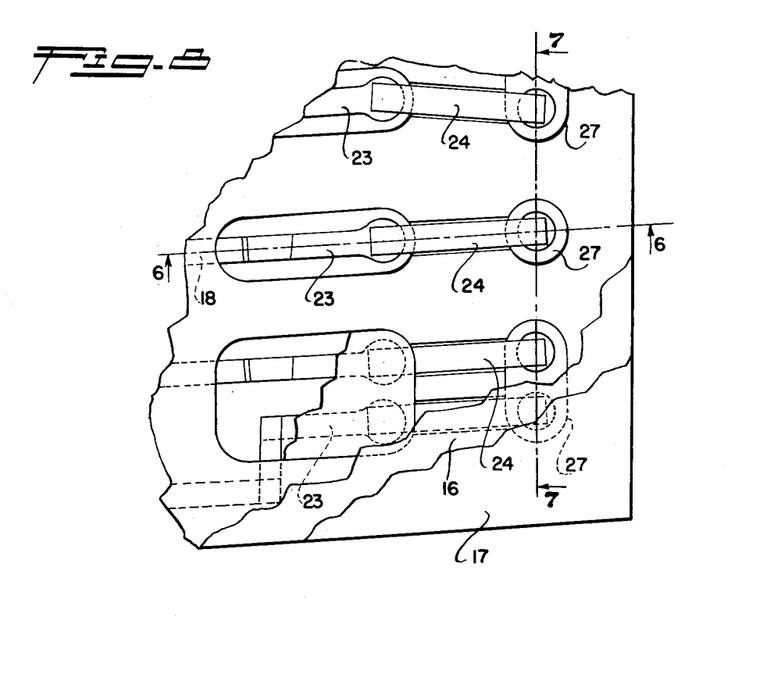
Figure 8 is a fragmentary plan view of a boot with parts broken away to illustrate the electrical connections with the heating elements.

The electrical terminals may be provided on or connected with the heating elements 15 and 150 in any selected or appropriate manner. The connecting buses or parts 19 at the connected adjacent ends of the runs 18 of the elements 15 may be formed and applied simultaneously with the elements themselves, that is they may be metal foil or metal electro-deposited on the dielectric layer 16 to be integral with their respective elements. One end of each heating element 15 and 150, that is the terminus of an outer or edge run 18 of each element, may have an extension 23 and a conductor 24 in the form of a flat tape or ribbon, may be electrically connected therewith by solder, or the like, as shown at 25 in Figure 6. A braided cable or wire 26 is, in turn, soldered or otherwise electrically connected with each of these conductors 24 and is received in a tubular insulator 27 of rubber, or the like, passing through an opening 28 in the structural skin 12. The backing layer 14 is cut out or recessed to receive the conductors 24 and insulators 27, as best illustrated in Figure 6. The other end of each heating element 15 at the top side of the boot B is connected with a bus 29 and the other terminal of each heating element 15 at the bottom of the side of the boot is connected with a similar bus 30, these connections being indicated at 31 in Figure 3. The central or intermediate elements 150 have similar buses 32. These buses 29, 30 and 32 may be metal foil or electro-deposited strips of suitable thickness applied to the layer 17 in the same manner as the heating elements 15. The buses 29, 30 and 32 have wires or conductors 33, 34 and 35 respectively, leading from the boot B and which may be of the same character as the conductors 26. The conductors 26, 33, 34 and 35, are connected in a sequentially timed electrical supply system, to be described below, so that their respective heating elements 15 and 150 are energized in a manner to effect the most efficient removal of the ice accumulations with a minimum expenditure of electrical energy.

It is a feature of the invention that the heating elements 15 of the boots B are energized by the high intensity electrical energy for relatively short periods of time to effect a cracking free and detachment of the ice accumulations and thus assure the removal or blowing away of the same by the relative air flow with a minimum of transference and loss of heat to the ice itself. The elements 15 of a given boot B are preferably cyclicly or sequentially energized in such a manner that the ice accumulations thereon are removed in strips or limited areas as distinguished from attempting to remove the entire ice accumulations at one time. We prefer to energize the heating elements 15 in progressive or step by step stages, beginning with the element 15 at or adjacent the leading edge of the boot, then energizing the next adjacent element 15 in the aft direction, then the third element from the leading edge, and so on, working aft to the aft region of the boot causing elongate spanwise portions of the ice accumulations at the leading edge to first break free and blow away, then causing the adjacent spanwise strip immediately aft thereof to blow free and so on, progressing chordwise across the boot in this fashion. This chordwise progressive energization of the heating elements 15 may be effected simultaneously at the upper and lower sides of a boot B, that is the elements 15 next to the continuously energized element 150 at both the top and bottom of the boot B may be energized at the same time, then the two elements 15 second from the element 150 are simultaneously energized and so on, rearwardly across both the top and bottom sides of the boot. Another mode of operation which may be preferred in many cases is to energize the elements 15 successively at, say, the upper side of the boot B beginning with the element nearest the leading edge element 150 and progressively energizing the other elements, working toward the aft edge of the boot B and when the top of the boot has been energized in this fashion then beginning this same sequence at the underside of the same boot B or beginning the same sequence at either the upper or lower side of another boot B. It will be apparent that many combinations of sequential programs are possible and that the cyclic or sequential energization of the heating elements 15 may be programed to effectively remove the ice accumulations from given parts of the airplane in a selected or preferred order or sequence. In the various programs of energizing the heating elements 15 the above described chordwise progression or successive energization of the elements in the aft direction beginning with the foremost element and ending with the rearmost element is important because it utilizes to the fullest extent the action of the air stream in successively tearing, blowing or peeling loose the strips of ice that are successively freed or merely cracked and cleared by the short duration, high intensity heating. This heating or energization of the heating elements 15 may be in true sequence or may overlap in point of time, that is the first or foremost heating element 15 may remain energized for a portion of or for the full period of energization of the next or second element 15 and this next or second element 15 may remain energized for the full period or for a portion of the period of the energization of the third element, and so on. However, it is desirable to relate the intensity of the heating and the duration of energization of the individual heating elements 15 in such a manner that a minimum of electrical energy is utilized in removing the tolerable ice accumulations. By the same token the "on" and "off" periods of operation of the boots B, that is the periods of time during which the elements 15 of a boot are energized and remain de-energized are so related as to require the employment or expenditure of a minimum of energy consistent with the positive or assured removal of tolerable accumulations of ice. The intensity of applied energy may be between, say, 20 and 100 watts per square inch of element area with 40 watts per square inch being an average or optimum value. The energy requirements of course, vary with surface temperature or ambient temperature and other factors and the energy applied to the heating elements 15 may be varied or adjusted as conditions dictate. The determination of the "off" period, that is the time when a heating element 15 remains de-energized, of course, is based upon the permissible thickness of ice accumulation and like factors. In practice, it has been found that in a typical case the "off" period may be about 98 seconds with the heating elements 15 each energized 2 seconds in each 100 second period or cycle. It will immediately be apparent that this relatively short "on" or energized period for each electrode 15 promotes great economy in electrical energy, there being only a small employment of energy at any one time in a de-icing system protecting all of the critical areas of an airplane. This, in turn, means that the load on the electrical system of the airplane remains low so that a relatively small light-weight generating system is required. The successive energization of the boots B, with the chordwise successive energization of their individual heating elements may be readily programed to effect the symmetrical removal of ice from the airplane. Where such symmetrical de-icing is not important the heating elements 15 of each boot may be electrically connected in such a manner that they are capable of simultaneous energization, and the boots may be successively energized and de-energized in a desired sequence. In other cases the elements 15 may be quite long to extend practically the entire length of the part to be de-iced and may be energized in the chordwise sequence. In still other instances the boots B may be quite short and the heating elements 15 of each boot may be electrically connected for simultaneous energization so that the boots may be successively energized to de-ice the airplane in a symmetrical manner and yet require only a relatively low expenditure of electrical energy at any one time.

In accordance with the broader aspects of the invention practically any suitable type of timing or sequencing system or mechanism may be employed to effect the above described sequential or progressive energization of the heating elements 15 of the boots B. In the drawings we have illustrated a preferred sequencing system or arrangement capable of controlling or operating a substantial number of de-icing boots B, for example all of the de-icing boots required on a given airplane. This system includes an electrical energy source that is in the form of an alternator or generator 36 driven by a propulsive engine, not shown, of the airplane A to supply a poly or three-phase circuit 37. An appropriate voltage regulator 38 is associated with the alternator 36. A control switch 39 is connected in the circuit 37 and may be directly or remotely operated to energize and de-energize the de-icing system. The circuit 37 continues to a main make and break switch 40. This switch 40 has two spaced stationary contacts 41 connected in each phase of the circuit 37 and two corresponding stationary contacts 42 and 43 for each phase electrically connected with the cycling device or timer, to be later described. The switch 40 further includes a multiple contactor having three contactors 44 for moving between positions where they electrically connect the contacts 42 with their respective contacts 41 and positions where they connect the contacts 43 with their respective contacts 41. The contactors 44 are operated to one position by a coil 442 and to the other position by a coil 443. This type of switch 40 is designed to carry substantial loads.

Energizing leads 142 and 143 extend from the switch operating coils 442 and 443 respectively to a timer switch 45 operable to alternately connect the leads to contacts 46 in a D. C. supply line 47. The coils 442 and 443 have a common ground 9 to structure so that operation of the timer switch 45 alternately energizes the coils to alternately change or reverse the positions of the contactors 44 and thus alternately energize the contacts 42 and 43. The switch 45 is operated by a rotating cam 48 shaped to hold each lead 142 and 143 in electrical connection with the power line contact 44 for approximately 180° of each revolution, that is each lead 142 and 143 is energized for approximately one-half of the time and for equal periods. The cam 48 is driven by a motor and speed reduction unit 49 which is energized by the power line 47. A switch 50 is connected in the power line 47 to be operated by a speed responsive device or governor 51. The governor 51, which may be of the fly ball type, is driven by the motor unit 49 and is arranged to open the switch 50 when the speed of operation of the motor unit 49 falls below a given value.

Figure 10:
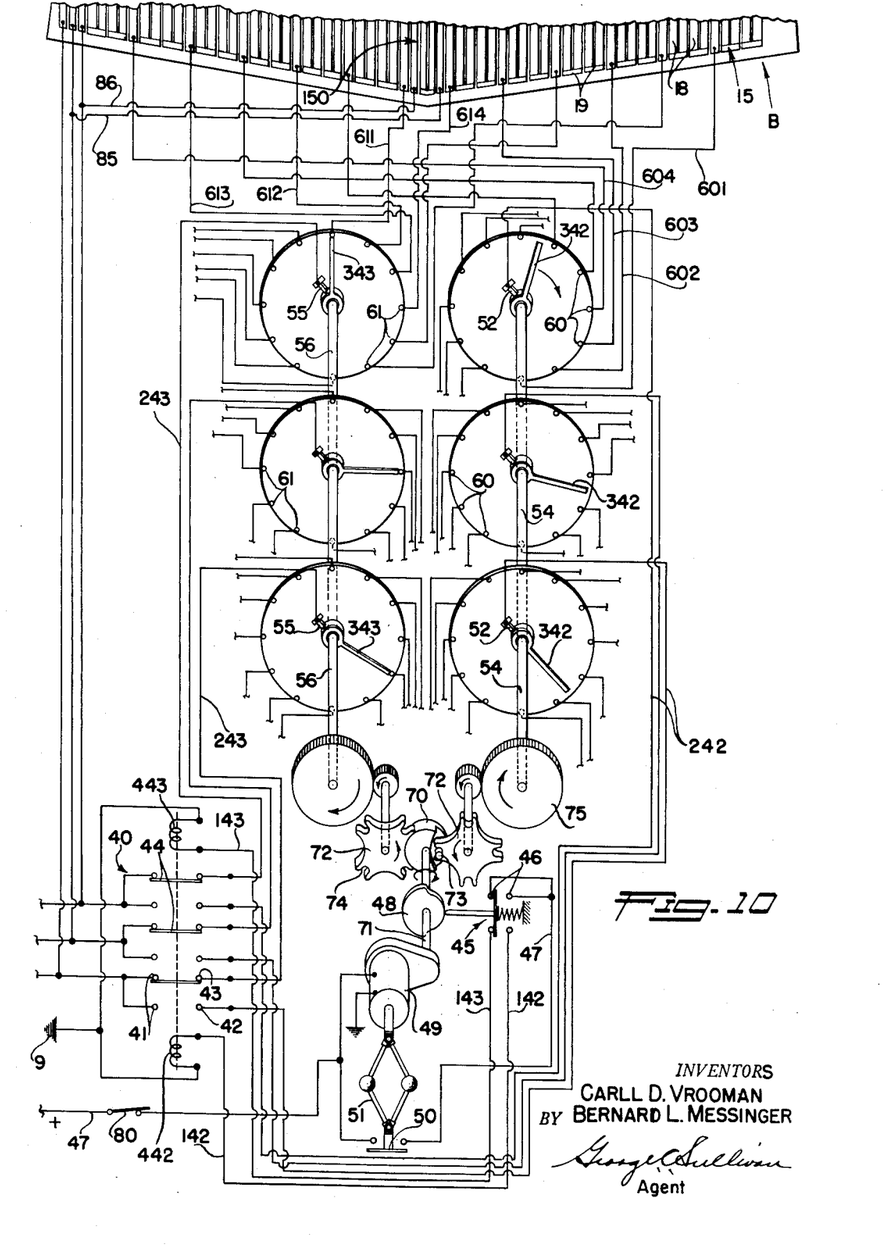
Figure 10 is a wiring diagram of the cyclic timer and associated parts.

The above described stationary contacts 42 of the switch 40 have leads 242 extending therefrom to brushes 52, or the equivalent, which electrically connect them with rotating contact arms 342. The arms 342 are fixed to a common rotatable shaft 54 to be turned thereby but are appropriately insulated from the shaft. As clearly illustrated in Figure 10, these arms 342 are set at different angular positions with respect to their shaft 54. Leads 243 from the stationary contacts 43 of the switch 40 extend to brushes 55, or the equivalent, which electrically connect them with rotating arms 343. The arms 343 are secured in different angular positions on a rotatable shaft 56 and are electrically insulated therefrom. The arms 342 and 343 are in the nature of sequencing or cycling contactors respectively adapted to cooperate with pluralities of spaced stationary contacts 60 and 61. The contacts 60 and 61 are electrically connected with the terminals 26 of the heating elements 15 by lines 601, 602, 603, etc. and 611, 612, 613, 614, etc. respectively. The heating elements 15 of the several boots B may be supplied from a single series of contacts 60 or 61 or where the boots B contain a large number of heating elements 15 each series of contacts 60 or 61 may supply a single boot. Furthermore, in some cases, each contact 60 and 61 may be connected to two or more heating elements 15 through the lines 601, 602, etc. and 611, 612, 613, etc. although it may be preferred to increase the number of contactors 342 and 343 and their respective stationary contacts 60 and 61 rather than overload the individual contact elements. As shown in Figure 10, the heating elements 15 at the upper and lower sides of a de-icing boot B are connected with the contactors 60 and 61 of an end pair of rotating arms 342 and 343 so that the top and bottom of the boots are de-iced in sequence.

An intermittent movement mechanism is provided to intermittently rotate the shafts 54 and 56 and thus advance or turn their respective contact arms 342 and 343. This mechanism as illustrated, is in the nature of a dual Geneva movement driven by the motor and speed reduction unit 49 which drives or operates the switch 45 described above. In fact, the intermittent movement mechanism may include a disc or cam 70 fixed to the shaft 71 which carries the cam 48 for operating the switch 45. This cam 70 cooperates with two like but diametrically opposite star wheels 72. The periphery of the cam 70 cooperates with correspondingly shaped recesses in the star wheels 72 and carries a pin 73 for intermittently engaging in notches 74 in the points of the star wheels to turn or advance the same. It will be seen how the constantly rotating cam 70 intermittently advances the star wheels 72, the arrangement being such that one wheel 72 dwells while the other advances. The action of Geneva movements is well known and further explanation of the intermittent movement mechanism is believed unnecessary. The star wheels 72 are connected with the shafts 54 and 56 by speed reducing gearing 75 so that one wheel drives the shaft 54 and one wheel drives the shaft 56. As shown in Figure 10, the setting or angular disposition of the contact arms 342 and 343 are such that the arms 343 are in engagement with stationary contacts 61 while the arms 342 are being advanced, the arms 342 being stationary and in engagement with contacts 60 while the arms 343 are being advanced. A more important relationship is the action or timing of the switch 40 in relation to the movements or advancements of the contact arms 342 and 343. As will be seen from the drawings and the foregoing detailed description, the switch 40 is repeatedly being operated or reversed by the action of the cam 48 reversing the timer switch 45, and the contact arms 342 and 343 are being intermittently advanced from one contact 60 and 61 to the other by the intermittent movement mechanism just described. The relationship mentioned above is such that the switch 40 is operated to complete the circuits to the arms 342 and contacts 60 after the contact arms 342 have come to rest in engagement with stationary contacts 60 and is operated to open or break the circuits to the contacts 60 before the arms 342 are again advanced to leave said contacts 60. Also, the switch 40 is operated to complete the circuits to the arms 343 and contacts 61 after the arms 343 have come to rest at certain contacts 61 and the switch 40 is operated to break the circuits to the contacts 61 before the arms 343 are again advanced from said contacts 61. This sequential or related action of the switch 40 and the arms 342 and 343 is important in that the arms 342 and 343 are never moved when energized, that is when carrying current, thereby relieving the contact arms 342 and 343 and their related contacts 60 and 61 of all of the harmful effects of making and breaking contact under load such as arcing, pitting, burning, etc. The single make and break switch 40 may be a heavy-duty device constructed to dependably withstand these effects or actions while the plurality of rotary cycling switches 342—60 and 343—61 may be simple, light service switches.

Figure 9:
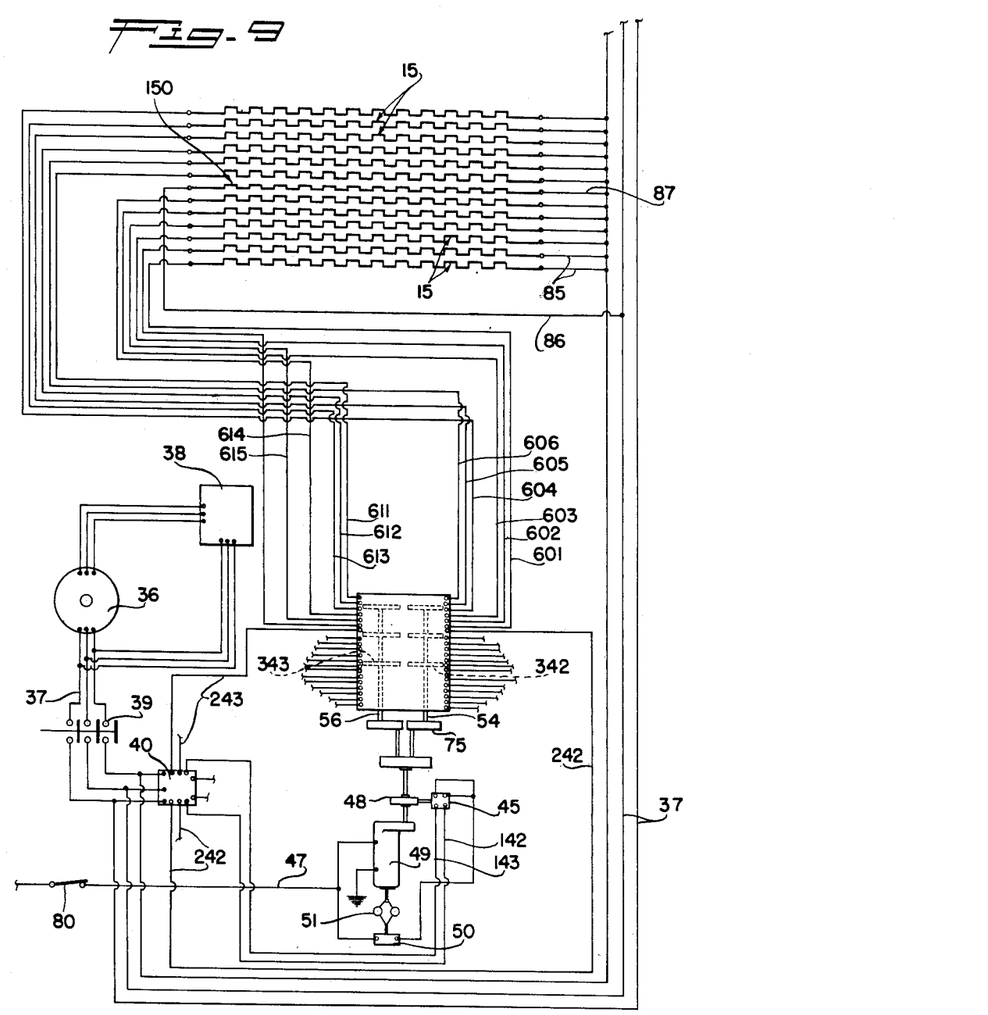
Figure 9 is a wiring diagram of the electrical circuits for supplying the heating elements of the boots, with the timer and associated parts illustrated in a general manner.

As described above, the lines 601, 602, 603, etc. and 611, 612, 613, etc. extend from the contacts 60 and 61 respectively of the rotary cycling switches to the heating elements 15 of the boots B where they are electrically connected with the terminal lines 26. In fact, the lines or wires 26 may be considered the end portions of the lines 601, 602, etc. and 611, 612, etc. The opposite ends of the heating elements 15 are connected with the buses 29 and 30 which, in turn, are connected with appropriate phases of the power circuit 37 by lines 85. Where the central or leading edge heating elements 150 are to be continuously energized while the de-icing system is in operation their circuits need not be controlled by the switch 40 or the cycling switches 60–342 or 61–343 and the energizing leads 86 for the elements 150 are connected in the circuit 37 to be controlled by the main or control switch 39. The buses 32 of the leading edge heating elements 150 are connected in the energizing circuit or power circuit 37 by a line 87, see Figure 9.

It is to be understood that the electrical system as above described may control or energize any required number of boots B and is capable of variation or alteration to adapt it to various situations and installations. In the drawings we have shown the heating elements 15 and 150 of one boot B connected with the timing or cycling system and have shown the lines 602, 603, 604, 611, 612, etc. extending from several of the cycling switches to be connected with the heating elements of the other boots B. For example, these lines may connect with and supply current to the heating elements 15 of the several boots B of the airplane shown in Figure 1.

Under icing conditions or when icing is anticipated the switch 80 controlling the D. C. line 47 and the switch 39 are closed. This energizes the motor 49 which drives the rotary cycling switches 60—342 and 61—343 and which rotates the cam 48 for operating the switch 45 and also supplies current to the make and break switch 40. With the switch 45 and the cycling switches 60—342 and 61—343 in operation the above described program or sequence of energization of the heating elements 15 is automatically performed at the several boots B. The leading edge heating elements 150 remain continuously energized so long as the system is in operation. As previously described, the heating elements 15 of boots B at different parts of the airplane may be energized in a selected sequence with one or more boots B either energized simultaneously or one after the other. At any one boot B, or at the upper and lower side of any one boot, the heating elements 15 are cyclicly energized beginning with the element 15 nearest the leading edge and then progressing chordwise of the boot in the aft direction until the rearmost element is energized, the time periods during which the adjacent elements are energized either being distinct or overlapping, that is partially concurrent at the terminal and initial phases of energization. This chordwise rearwardly progressive energization of the elements 15 with the application of relatively high intensity electrical energy at each energization results in the rapid or almost instantaneous heating of spanwise regions or strips of the outer skin 17 to free the ice accumulation in corresponding strips. These strips or elongate areas of ice are progressively torn, blown or peeled free by the high velocity air stream. In practice, minimal proportions of the ice are melted or converted into water, the high intensity heat applied for short periods serving to loosen the bond at the ice-metal interface and to crack the ice layer so that it is carried away by the wind as distinguished from a substantial melting of the ice layer. Where the leading edge region of the boot B is maintained free of ice by the continuously energized element 150 the airstream has full access to the forward strip of ice freed by the foremost heating element 15 and when this strip of ice is blown away the ice at the second heating element 15 is exposed for removal by the wind. This ice freeing or blowing away action progresses across the boot B in the aft direction with practically no run-back of water to refreeze on the wing beyond the boot B. As previously described, the "off" periods of the boots B are of long duration with respect to the "on" or energized periods so that at any one time there is a minimum of electrical energy being employed. The ice layers that accumulate during the "off" periods are tolerable, that is, not excessive, and when they are substantially completely removed with each energization of the boots B the ice cannot accumulate in excessive quantities even during prolonged periods of icing conditions.

It is to be observed that there is the most efficient employment of electrical energy, not only by reason of the cyclic chordwise and aft extending sequence of energization of the heating elements 15 just described, but also by reason of the construction of the boots B. The backing layer or sheet 14 of each boot forms an effective thermal barrier for preventing the inward loss of heat from the elements 15 and 150. The heating elements 15 and 150 are shaped to present approximately one-half of their total surface areas for the outward transference of heat and these surfaces are as close as practical to the outer skin 17. Thus the heat from the heating elements is efficiently supplied to the skin 17 which is metal to effectively distribute the heat to the ice-metal interface. The boots B are substantially rigid structures which materially facilitates their installation and makes it possible to employ simple, sturdy wiring to their heating elements 15 and 150.

Having described only typical forms of the invention we do not wish to be limited to the specific details herein set forth, but wish to reserve to ourselves any variations or modifications that may appear to those skilled in the art and fall within the scope of the following claims.

We claim:

1. De-icing means including a boot unit having a leading edge and a major region extending aft from the leading edge, the boot unit comprising a thin skin of a metal having a high thermal conductivity coextensive with said leading edge and major region and presenting an outer surface on which ice accumulates, a dielectric layer of from .001 to .020 inch thick on the inner surface of the skin, a plurality of elongate ribbon-like heating elements on said layer extending substantially parallel with said leading edge and spaced one from the other in a direction aft from said edge, said plurality of elements constituting an uninterrupted series, a rigid thermal insulating member at the inner sides of said elements, and means progressively energizing and de-energizing successive adjacent elements of said series beginning with the elements nearest said edge and progressing without break in the aft direction across said entire series to the element most remote from said edge, the last named means including an electrical source, a circuit system for connecting said elements with said source, and a timer mechanism connected in and controlling said system to effect the progressive energization and de-energization of the elements.

2. In a de-icing system the combination of; a thin metal skin comprising a leading edge, an upper region extending aft from the leading edge and a lower region extending aft from the leading edge, a di-electric film on the inner surface of the skin, a thin elongate ribbon-like resistance heating element on said film at said leading edge, a plurality of elongate ribbon-like resistance heating elements on said film at the upper region of the skin extending substantially parallel with said edge and spaced one from the other in the chordwise direction, a plurality of elongate ribbon-like resistance heating elements on said film at the lower region of the skin extending substantially parallel with said leading edge and spaced one from the other in the chordwise direction, the elements comprising thin layers of metal coated on said film, an electrical energy source, a circuit continuously energizing the first named heating element, a circuit system from said source to individual elements of each of said pluralities of elements, and timer means in said system progressively energizing and de-energizing successive adjacent elements of each of said pluralities beginning with the element nearest said first named element and progressing without break in aft direction across the pluralities in the aft direction to the elements most remote from the leading edge.

3. De-icing means as in claim 1 and having a thin elongate ribbon-like resistance heating element on said di-electric layer at said leading edge, and a circuit for continuously energizing said thin elongate ribbon-like resistance heating element.

4. In a de-icing system the combination of; a thin metal skin comprising a leading edge, an upper region extending aft from the leading edge and a lower region extending aft from the leading edge, a dielectric film on the inner surface of the skin, a thin elongate ribbon-like resistance heating element on said film at said leading edge, a plurality of elongate heating elements on said film at the upper region of the skin extending substantially parallel with said edge and spaced one from the other in the chordwise direction, a plurality of elongate heating elements on said film at the lower region of the skin extending substantially parallel with said leading edge and spaced one from the other in the chordwise direction, said heating elements consisting only of thin ribbon-like resistors, an electrical energy source, a circuit continuously energizing the first named heating element, a circuit system from said source to individual elements of each of said pluralities of elements, and timer means in said system progressively energizing and de-energizing successive adjacent elements of each of said pluralities simultaneously, beginning with the element nearest said first named element and progressing without break in aft direction across the pluralities in the aft direction to the elements most remote from the leading edge.

5. A de-icing system including a plurality of boots each having a leading edge and comprising a plurality of electric resistance type heating elements extending generally parallel with the leading edge and spaced one from the other in the aft direction from said edge, said heating elements consisting only of thin-ribbon-like resistors, and means for successively energizing and then de-energizing said elements beginning with the element nearest the leading edge and progressing without a break in the energization and de-energization of each successive element to the element most remote from said edge and for simultaneously energizing and de-energizing the respective elements in each of said boots including an electrical energy source, cycling switches having stationary spaced contacts and movable contacts movable from one stationary contact to the other in sequence, leads extending from the stationary contacts to said elements, conductors extending from the movable contacts, make and break switch means operable to alternately connect and disconnect said conductors with the source, and means for operating the make and break switch means and cycling switches so that said switch means is operated only when said movable contacts have been previously advanced to respective stationary contacts and so that said switch means does not operate when the movable contacts are in motion including motor driven cam means for operating the make and break switch means and means mechanically timed with said cam means for successively operating the movable contacts prior to actuation of the make and break switch means.

References Cited in the file of this patent

UNITED STATES PATENTS

| | | |
|---|---|---|
| 1,846,468 | Benson | Feb. 23, 1932 |
| 2,205,543 | Rideau et al. | June 25, 1940 |
| 2,297,540 | Driscoll | Sept. 29, 1942 |
| 2,464,273 | Tanchel | Mar. 15, 1949 |
| 2,466,238 | Hoof | Apr. 5, 1949 |
| 2,496,279 | Ely et al. | Feb. 7, 1950 |
| 2,552,075 | Van Daam | May 8, 1951 |
| 2,590,944 | Cowdrey et al. | Apr. 1, 1952 |
| 2,625,661 | Haydon | Jan. 13, 1953 |
| 2,627,012 | Kinsella et al. | Jan. 27, 1953 |

FOREIGN PATENTS

| | | |
|---|---|---|
| 224,648 | Great Britain | Nov. 20, 1924 |
| 935,233 | France | Feb. 2, 1948 |